US012587291B2

(12) United States Patent　　Kielkowski

(10) Patent No.: US 12,587,291 B2
(45) Date of Patent: Mar. 24, 2026

(54) ANTENNA DIVERSITY IMPLEMENTATION FOR REMOTE SENSORS IN AN HVAC SYSTEM

(71) Applicant: Carrier Corporation, Palm Beach Gardens, FL (US)

(72) Inventor: Ron Kielkowski, Indianapolis, IN (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 619 days.

(21) Appl. No.: 17/944,492

(22) Filed: Sep. 14, 2022

(65) Prior Publication Data

US 2024/0089017 A1　　Mar. 14, 2024

Related U.S. Application Data

(60) Provisional application No. 63/244,963, filed on Sep. 16, 2021.

(51) Int. Cl.
H04B 17/318 (2015.01)
F24F 11/58 (2018.01)

(52) U.S. Cl.
CPC ............ H04B 17/318 (2015.01); *F24F 11/58* (2018.01)

(58) Field of Classification Search
CPC ............................... H04B 17/318; F24F 11/58
See application file for complete search history.

(56) References Cited

U.S. PATENT DOCUMENTS

| | | | |
|---|---|---|---|
| 9,742,481 B1 * | 8/2017 | Jorgovanovic | ......... H04B 7/082 |
| 10,748,360 B2 | 8/2020 | Telljohann et al. | |
| 2020/0149771 A1 * | 5/2020 | Sinha | .................... H04W 76/10 |
| 2020/0244326 A1 * | 7/2020 | Daugherty | ........... H04B 7/0602 |
| 2021/0218158 A1 * | 7/2021 | Kim | ......................... H01Q 1/38 |
| 2021/0273347 A1 * | 9/2021 | Bruhn | ...................... H01Q 3/02 |

FOREIGN PATENT DOCUMENTS

WO　　WO-2023195973 A1 * 10/2023　　.............. G01S 3/08

* cited by examiner

*Primary Examiner* — Charles C Jiang
*Assistant Examiner* — Ryan C Kavleski
(74) *Attorney, Agent, or Firm* — CANTOR COLBURN LLP

(57) ABSTRACT

A method of operating a sensor in wireless communication with a thermostat of a heating, ventilation, and air conditioning (HVAC) system including: activating a first sensor antenna and a second sensor antenna to detect a first wireless signal transmitted from the thermostat of the HVAC system; detecting the first wireless signal using the first sensor antenna and the second sensor antenna; determining a first strength of the first wireless signal as detected by the first sensor antenna and a second strength of the first wireless signal as detected by the second sensor antenna; comparing the second signal strength to the first signal strength to determine which is greater; and detecting future wireless signals transmitted from the thermostat for a first selected period of time using the first sensor antenna if the first signal strength is greater or the second sensor antenna if the second signal strength is greater.

17 Claims, 3 Drawing Sheets

600

ACTIVATING A FIRST SENSOR ANTENNA TO DETECT A FIRST WIRELESS SIGNAL TRANSMITTED FROM THE THERMOSTAT OF THE HVAC SYSTEM ⌐604

DETECTING THE FIRST WIRELESS SIGNAL TRANSMITTED FROM THE THERMOSTAT USING THE FIRST SENSOR ANTENNA ⌐606

DETERMINING A FIRST STRENGTH OF THE FIRST WIRELESS SIGNAL AS DETECTED BY THE FIRST SENSOR ANTENNA ⌐608

ACTIVATING A SECOND SENSOR ANTENNA TO DETECT THE FIRST WIRELESS SIGNAL TRANSMITTED FROM THE THERMOSTAT OF THE HVAC SYSTEM ⌐610

DETECTING THE FIRST WIRELESS SIGNAL TRANSMITTED FROM THE THERMOSTAT USING THE SECOND SENSOR ANTENNA ⌐612

DETERMINING A SECOND STRENGTH OF THE FIRST WIRELESS SIGNAL AS DETECTED BY THE SECOND SENSOR ANTENNA ⌐614

COMPARING THE SECOND SIGNAL STRENGTH TO THE FIRST SIGNAL STRENGTH TO DETERMINE WHICH OF THE FIRST SIGNAL STRENGTH AND THE SECOND SIGNAL STRENGTH IS GREATER ⌐616

618                                                                                  620

OR

DETECTING FUTURE WIRELESS SIGNALS TRANSMITTED FROM THE THERMOSTAT FOR A FIRST SELECTED PERIOD OF TIME USING THE FIRST SENSOR ANTENNA IF THE FIRST SIGNAL STRENGTH IS GREATER THAN THE SECOND SIGNAL STRENGTH

DETECTING FUTURE WIRELESS SIGNALS TRANSMITTED FROM THE THERMOSTAT FOR THE FIRST SELECTED PERIOD OF TIME USING THE SECOND SENSOR ANTENNA IF THE SECOND SIGNAL STRENGTH IS GREATER THAN THE FIRST SIGNAL STRENGTH

FIG. 3

ANTENNA DIVERSITY IMPLEMENTATION FOR REMOTE SENSORS IN AN HVAC SYSTEM

CROSS-REFERENCE TO RELATED APPLICATIONS

This application claims the benefit of U.S. Provisional Application No. 63/244,963 filed Sep. 16, 2021, the disclosure of which is incorporated herein by reference in its entirety.

BACKGROUND

The embodiments herein generally relate to a heating, ventilation, and air conditioning (HVAC) system and more specifically to a system and method for controlling wireless communication between a thermostat of the HVAC system and individual sensors of the HVAC system.

HVAC is an important part of residential, industrial and commercial structures. The heating process in HVAC systems provides for increases in indoor temperatures while the air conditioning process provides for decreases in indoor temperatures. The ventilation processes involves exchanges or replacements of air in a space to thus provide for high indoor air quality with temperature control, oxygen replenishment and removal of moisture, odors, smoke, heat, dust, airborne bacteria, carbon dioxide and other gases. Ventilation includes both the exchange of indoor and outdoor air as well as the circulation of air within a building.

Home-based HVAC systems typically include an outdoor unit, an indoor unit, a thermostat and one or more sensors in some cases. The thermostat is usually accessible to the homeowner who uses the thermostat to set a desired temperature for an indoor space in a home. The thermostat then operates the outdoor and indoor units so as to achieve that desired temperature in a manner that also reduces costs and energy usage as much as possible. To this end, if the temperature in the indoor space is lower than the desired temperature by a predetermined degree, the thermostat will command (e.g., if in a heating mode) the outdoor and indoor units to pump heated air into the indoor space so as to raise the temperature of the indoor space beyond the desired temperature by a predetermined degree. On the other hand, if the temperature in the indoor space is higher than the desired temperature by a predetermined degree, the thermostat will command (e.g., if in a cooling mode) the outdoor and indoor units to pump cool air into the indoor space so as to lower the temperature of the indoor space beyond the desired temperature by a predetermined degree.

BRIEF DESCRIPTION

According to one embodiment, a method of operating a sensor in wireless communication with a thermostat of a heating, ventilation, and air conditioning (HVAC) system is provided. The method including: activating a first sensor antenna and a second sensor antenna to detect a first wireless signal transmitted from the thermostat of the HVAC system; detecting the first wireless signal transmitted from the thermostat using the first sensor antenna and the second sensor antenna; determining a first strength of the first wireless signal as detected by the first sensor antenna and a second strength of the first wireless signal as detected by the second sensor antenna; comparing the second signal strength to the first signal strength to determine which of the first signal strength and the second signal strength is greater; and detecting future wireless signals transmitted from the thermostat for a first selected period of time using the first sensor antenna if the first signal strength is greater than the second signal strength or detecting future wireless signals transmitted from the thermostat for the first selected period of time using the second sensor antenna if the second signal strength is greater than the first signal strength.

In addition to one or more of the features described above, or as an alternative, further embodiments may include that the first sensor antenna and the second sensor antenna are activated at different times to detect the first wireless signal transmitted from the thermostat of the HVAC system.

In addition to one or more of the features described above, or as an alternative, further embodiments may include that the second sensor antenna is deactivated when the first sensor antenna is activated to detect the first wireless signal transmitted from the thermostat of the HVAC system.

In addition to one or more of the features described above, or as an alternative, further embodiments may include that the first sensor antenna is deactivated when the second sensor antenna is activated to detect the first wireless signal transmitted from the thermostat of the HVAC system.

In addition to one or more of the features described above, or as an alternative, further embodiments may include that the first sensor antenna and the second sensor antenna are activated simultaneously to detect the first wireless signal transmitted from the thermostat of the HVAC system.

In addition to one or more of the features described above, or as an alternative, further embodiments may include that the first sensor antenna is oriented at a first orientation and the second sensor antenna is oriented at a second orientation, the second orientation being different than the first orientation.

In addition to one or more of the features described above, or as an alternative, further embodiments may include that the second orientation is perpendicular to the first orientation.

In addition to one or more of the features described above, or as an alternative, further embodiments may include activating the first sensor antenna and the second sensor antenna to detect a second wireless signal transmitted from the thermostat of the HVAC system once the first selected period of time has ended; detecting the second wireless signal transmitted from the thermostat using the first sensor antenna and the second sensor antenna; determining a third strength of the second wireless signal as detected by the first sensor antenna and a fourth strength of the second wireless signal as detected by the second sensor antenna; comparing the fourth signal strength to the third signal strength to determine which of the third signal strength and the fourth signal strength is greater; and detecting future wireless signals transmitted from the thermostat for a second selected period of time using the first sensor antenna if the third signal strength is greater than the fourth signal strength or detecting future wireless signals transmitted from the thermostat for the second selected period of time using the second sensor antenna if the fourth signal strength is greater than the third signal strength.

According to another embodiment, a sensor for a heating, ventilation, and air conditioning (HVAC) system is provided. The sensor including: a sensing apparatus configured to detect at least a temperature; a first sensor antenna; a second sensor antenna; and a sensor controller including: a processor; and a memory including computer-executable instructions that, when executed by the processor, cause the processor to perform operations, the operations including: activating the first sensor antenna and the second sensor antenna to detect a first wireless signal transmitted from a thermostat of the HVAC system; detecting the first wireless signal transmitted from the thermostat using the first sensor antenna and the second sensor antenna; determining a first strength of the first wireless signal as detected by the first sensor antenna and a second strength of the first wireless signal as detected by the second sensor antenna; comparing the second signal strength to the first signal strength to determine which of the first signal strength and the second signal strength is greater; and detecting future wireless signals transmitted from the thermostat for a first selected period of time using the first sensor antenna if the first signal strength is greater than the second signal strength or detecting future wireless signals transmitted from the thermostat for the first selected period of time using the second sensor antenna if the second signal strength is greater than the first signal strength.

In addition to one or more of the features described above, or as an alternative, further embodiments may include an antenna switching device configured to switch between the first sensor antenna and the second sensor antenna.

In addition to one or more of the features described above, or as an alternative, further embodiments may include a signal reception comparator configured to determine a strength of wireless signals received from each of the first sensor antenna and the second sensor antenna and compare signal strengths at selected time intervals.

In addition to one or more of the features described above, or as an alternative, further embodiments may include that the first sensor antenna and the second sensor antenna are activated at different times to detect the first wireless signal transmitted from the thermostat of the HVAC system.

In addition to one or more of the features described above, or as an alternative, further embodiments may include that the operations further include: deactivating the second sensor antenna when the first sensor antenna is activated to detect the first wireless signal transmitted from the thermostat of the HVAC system.

In addition to one or more of the features described above, or as an alternative, further embodiments may include deactivating the first sensor antenna when the second sensor antenna is activated to detect the first wireless signal transmitted from the thermostat of the HVAC system.

In addition to one or more of the features described above, or as an alternative, further embodiments may include that the first sensor antenna and the second sensor antenna are activated simultaneously to detect the first wireless signal transmitted from the thermostat of the HVAC system.

In addition to one or more of the features described above, or as an alternative, further embodiments may include that the first sensor antenna is oriented at a first orientation and the second sensor antenna is oriented at a second orientation, the second orientation being different than the first orientation.

In addition to one or more of the features described above, or as an alternative, further embodiments may include that the second orientation is perpendicular to the first orientation.

In addition to one or more of the features described above, or as an alternative, further embodiments may include that the operations further include: activating the first sensor antenna and the second sensor antenna to detect a second wireless signal transmitted from the thermostat of the HVAC system once the first selected period of time has ended; detecting the second wireless signal transmitted from the thermostat using the first sensor antenna and the second sensor antenna; determining a third strength of the second wireless signal as detected by the first sensor antenna and a fourth strength of the second wireless signal as detected by the second sensor antenna; comparing the fourth signal strength to the third signal strength to determine which of the third signal strength and the fourth signal strength is greater; and detecting future wireless signals transmitted from the thermostat for a second selected period of time using the first sensor antenna if the third signal strength is greater than the fourth signal strength or detecting future wireless signals transmitted from the thermostat for the second selected period of time using the second sensor antenna if the fourth signal strength is greater than the third signal strength.

According to another embodiment, a computer program product tangibly embodied on a non-transitory computer readable medium is provided. The computer program product including instructions that, when executed by a processor, cause the processor to perform operations including: activating a first sensor antenna and second sensor antenna to detect a first wireless signal transmitted from a thermostat of a HVAC system; detecting the first wireless signal transmitted from the thermostat using the first sensor antenna and the second sensor antenna; determining a first strength of the first wireless signal as detected by the first sensor antenna and a second strength of the first wireless signal as detected by the second sensor antenna; comparing the second signal strength to the first signal strength to determine which of the first signal strength and the second signal strength is greater; and detecting future wireless signals transmitted from the thermostat for a first selected period of time using the first sensor antenna if the first signal strength is greater than the second signal strength or detecting future wireless signals transmitted from the thermostat for the first selected period of time using the second sensor antenna if the second signal strength is greater than the first signal strength.

In addition to one or more of the features described above, or as an alternative, further embodiments may include that the operations further include: activating the first sensor antenna and the second sensor antenna to detect a second wireless signal transmitted from the thermostat of the HVAC system once the first selected period of time has ended; detecting the second wireless signal transmitted from the thermostat using the first sensor antenna and the second sensor antenna; determining a third strength of the second wireless signal as detected by the first sensor antenna and a fourth strength of the second wireless signal as detected by the second sensor antenna; comparing the fourth signal strength to the third signal strength to determine which of the third signal strength and the fourth signal strength is greater; and detecting future wireless signals transmitted from the thermostat for a second selected period of time using the first sensor antenna if the third signal strength is greater than the fourth signal strength or detecting future wireless signals transmitted from the thermostat for the second selected period of time using the second sensor antenna if the fourth signal strength is greater than the third signal strength.

Technical effects of embodiments of the present disclosure include switching between a first sensor antenna and a second sensor antenna between depending on which sensor antenna detects the strongest wireless signal strength from a thermostat.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The following descriptions should not be considered limiting in any way. With reference to the accompanying drawings, like elements are numbered alike:

FIG. 3 is a flow process illustrating a method of operating the sensor in wireless communication with the thermostat of the HVAC system, according to an embodiment of the present disclosure.

DETAILED DESCRIPTION

A detailed description of one or more embodiments of the disclosed apparatus and method are presented herein by way of exemplification and not limitation with reference to the Figures.

As will be described below, a heating, ventilation and air-conditioning (HVAC) system for a structure is provided. The HVAC system may include an outdoor unit disposed at an exterior of the structure and an indoor unit disposed at an interior of the structure. Various operations of the outdoor and indoor units are controllable to maintain desired environmental conditions in the interior of the structure using a thermostat in wireless communication with one or more sensors spread throughout the structure. Embodiments disclosed herein seek to provide better wireless communication between the thermostat and the sensors using antenna diversity.

Figure 1:
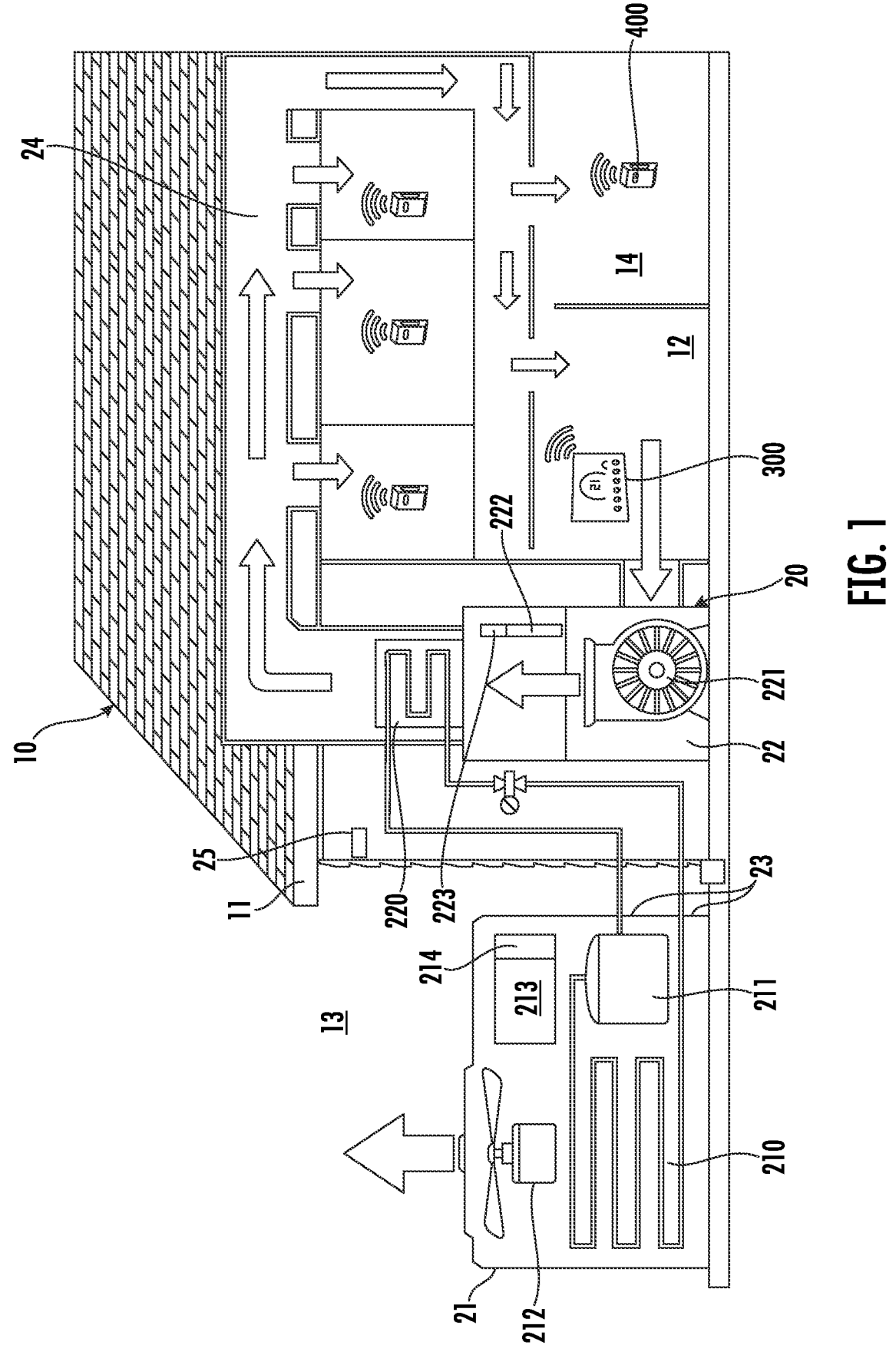
FIG. 1 is a perspective view of a structure in which a heating, ventilation and air-conditioning (HVAC) system is deployed, according to an embodiment of the present disclosure.

FIG. 1 is schematic view of a structure 10 and an HVAC system 20 for the structure 10, according to an embodiment of the present disclosure. The structure 10 may be configured as a residence, an industrial building, or a commercial building. For purposes of clarity and brevity, however, the following description will relate to the case where the structure 10 is configured as a single-family residence. The structure 10 thus includes a structural body 11 which defines an interior 12 and separates the interior 12 from an exterior 13. The interior 12 may be further divided into multiple rooms 14 and areas for various purposes.

The structure 10 includes an HVAC system 20 disposed and configured to control environmental conditions within the interior 12. The HVAC system 20 includes one or more of an outdoor unit 21 and an indoor unit 22. The outdoor unit 21 is disposed at the exterior 13 of the structural body 11 and the indoor unit 22 is disposed in the interior 12 of the structural body 11.

As shown in FIG. 1, the outdoor unit 21 includes a condenser coil 210, a compressor 211, a fan 212 and, in some cases, a first processing element 213 and a first wireless transceiver 214. The first wireless transceiver 214 may be in wireless communication with a thermostat 300. Alternatively, the outdoor unit 21 may be in wired communication with the thermostat 300. As shown in FIG. 1, the indoor unit 22 includes an indoor coil 220, a furnace 221 and, in some cases, a second processing element 222 and a second wireless transceiver 223. The second wireless transceiver 223 may be in wireless communication with a thermostat 300. Alternatively, the indoor unit 22 may be in wired communication with the thermostat 300.

Refrigeration lines 23 are provided to connect the outdoor unit 21 with the indoor unit 22 and ducts 24 are provided throughout the interior 12 such that heated or cooled air can be transported from the indoor unit 22 to the various areas in the interior 12. It is understood that while FIG. 1 illustrated a particular arrangement of ducts 24, the embodiments disclosed herein may apply to any arrangement of ducts 24. Although illustrated in FIG. 1 that the HVAC system 20 may include ducts 24, it should be appreciated that the HVAC system 20 may be ductless in certain instances.

In some cases, the components of the outdoor unit 21 and the indoor unit 22 may be included in a single unit that can be disposed at the exterior 13 of the structural body 11 or in the interior 12. For example, the components of the indoor unit 22 may be included in the outdoor unit 21 and disposed at the exterior 13. Conversely, the components of the outdoor unit 21 may be included in the indoor unit 22 and disposed in the interior 12. Still other embodiments exist in which the components of the outdoor and indoor units 21 and 22 are included in a single device which is partially disposed at the exterior 13 and partially disposed in the interior 12 (e.g., a window air-conditioning unit).

The HVAC system 20 may further include one or more sensors 400, such as temperature sensors, that are distributed throughout the interior 12 and possibility at the exterior 13. The sensors 400 are in wireless communication with the thermostat 300, a further discussed herein. The thermostat 300 is generally accessible to an individual and is configured to control various operations of the outdoor unit 21 and indoor unit 22 to maintain desired environmental conditions in the interior 12 in accordance with at least readings of the one or more sensors 400 and with user inputted commands.

The thermostat 300 may have the capability to establish and maintain wireless connectivity over various networks (e.g., Wi-Fi, Bluetooth, Z-Wave, Zigbee, etc.). The thermostat 300 can therefore be connected to a homeowner's Wi-Fi network and the Internet. This may allow the thermostat 300 to have additional features and capabilities including, but not limited to, being remotely controllable by a user using the portable computing device (e.g., a mobile phone, a tablet, a laptop, etc.).

Figure 2:
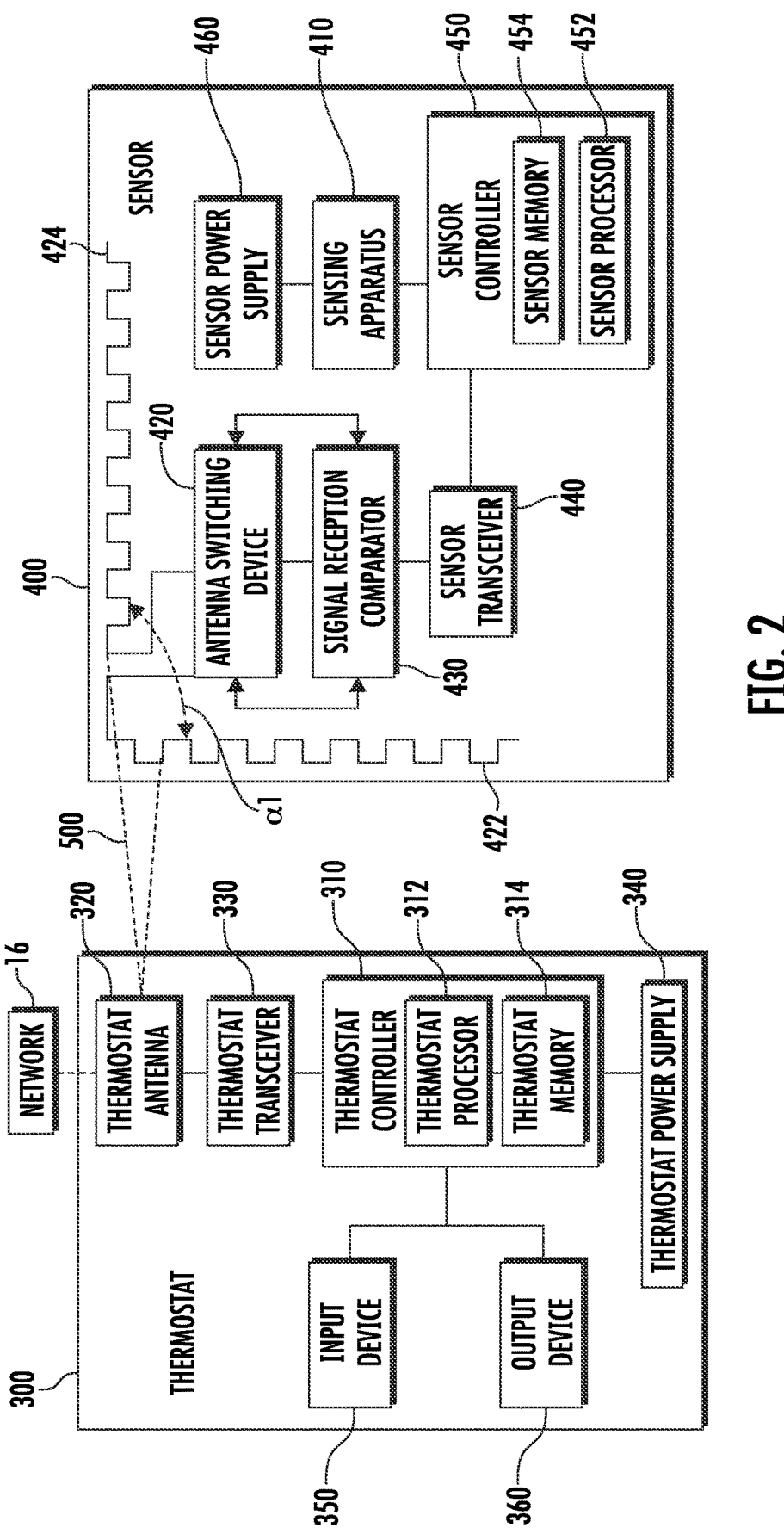
FIG. 2 is a block diagram of the wireless connection between a thermostat and a sensor of the HVAC system of claim 1, according to an embodiment of the present disclosure.

Referring now to FIG. 2, with continued reference to FIG. 1, a block diagram of the wireless connection between the thermostat 300 and the sensor 400, according to an embodiment of the present disclosure. It should be appreciated that, although particular systems are separately defined in the schematic block diagrams, each or any of the systems may be otherwise combined or separated via hardware and/or software.

The thermostat 300 includes a thermostat controller 310, a thermostat antenna 320, a thermostat transceiver 330, a thermostat processor 312, a thermostat memory 314, an input device 350, an output device 360, and a thermostat power supply 340.

The thermostat transceiver 330 is capable of transmitting and receiving data through the thermostat antenna 320 to and from at least the sensor 400 and the network 16. The network 16 may be a cloud computing network. The thermostat transceiver 330 may be capable of wireless communication including but not limitation to a near field communication (NFC), Bluetooth, infrared, ZigBee, Wi-Fi, Thread, Matter, any radio wave, or another appropriate wireless transceiver. The thermostat antenna 320 is any antenna appropriate to the thermostat transceiver 330. The thermostat power supply 340 is a power source such as line power connection, a power scavenging system, or a battery that powers the thermostat 300.

The thermostat controller 310 may be an electronic controller including a thermostat processor 312 and an associated thermostat memory 314 comprising computer-executable instructions (i.e., computer program product) that, when executed by the thermostat processor 312, cause the thermostat processor 312 to perform various operations. The thermostat processor 312 may be, but is not limited to, a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The thermostat memory 314 may be but is not limited to a random access memory (RAM), read only memory (ROM), or other electronic, optical, magnetic or any other computer readable medium.

The thermostat 300 may include an input device 350 configured to receive a manual input from an operator (e.g., human being) of the thermostat 300. The input device 350 may be a keyboard, a touch screen, a joystick, a knob, a touchpad, one or more physical buttons, a microphone configured to receive a voice command, a camera or sensor configured to receive a gesture command, or any similar input device known to one of skill in the art. The input device 350 may allow the operator of the thermostat 300 to enter a command 380 to activate, deactivate, and/or adjust the HVAC system 20 via a manual input to the input device 350. The thermostat 300 may include an output device 360 configured to convey operating and/or sensed data of the HVAC system 20. The output device 360 may include indicator lights, a display screen, a speaker, or any similar output devices known to one of skill in the art.

The sensor 400 includes a sensing apparatus 410, a sensor controller 450, a first sensor antenna 422, a second sensor antenna 424, an antenna switching device 420, a signal reception comparator 430, a sensor transceiver 440, a sensor processor 452, a sensor memory 454, and a sensor power supply 460.

The sensing apparatus 410 may be a device configured to sense or detect temperature, humidity, $CO_2$, CO, smoke, and/or air quality.

The sensor transceiver 440 is capable of transmitting and receiving data through the first sensor antenna 422 and the second sensor antenna 424 to and from the thermostat 300. The sensor transceiver 440 may be capable of wireless communication including but not limitation to a near field communication (NFC), Bluetooth, infrared, ZigBee, Wi-Fi, Thread, Matter, any radio wave, or another appropriate wireless transceiver. The first sensor antenna 422 and the second sensor antenna 424 may be any antenna appropriate to the sensor transceiver 440. The first sensor antenna 422 and the second sensor antenna 424 may be a printed circuit board trace antenna, a monopole antenna, fractal antenna, microstrip antenna, a planar inverted F antenna, stub, or any other type of antenna known to one of skill in the art. The first sensor antenna 422 and the second sensor antenna 424 may be the same type of antennas or different types of antennas. The first sensor antenna 422 and the second sensor antenna 424 may be located inside or outside the sensor 400. The sensor power supply 460 is a power source such as line power connection, a power scavenging system, or a battery that powers the sensor 400.

The sensor controller 450 may be an electronic controller including a sensor processor 452 and an associated sensor memory 454 comprising computer-executable instructions (i.e., computer program product) that, when executed by the sensor processor 452, cause the sensor processor 452 to perform various operations. The sensor processor 452 may be, but is not limited to, a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The sensor memory 454 may be but is not limited to a random access memory (RAM), read only memory (ROM), or other electronic, optical, magnetic or any other computer readable medium.

The first sensor antenna 422 and the second sensor antenna 424 are configured to receive a wireless signal 500 transmitted by the thermostat antenna 320. When there is no clear line-of-sight path between the thermostat antenna 320 and the sensor antennas 422, 424 then wireless signal 500 being transmitted by the thermostat antenna 320 may tend to arrive at the sensor antennas 422, 424 along multiple different paths due to distortion. Distortion in the wireless signal 500 may occur when striking different objects within the interior 12 of the structure 10. Such objects may include but are not limited to walls, doors, floors, ceilings, furniture, people, or any other object that may interfere with a wireless signal 500 known to one of skill in the art. The effect that the objects have on distorting the wireless signal 500 may change as object continuously move around within the interior 12 of the structure 10. The reflection of the wireless signal 500 may cause the wireless signal 500 to arrive at the sensor 400 in different orientations with each transmission of the wireless signal 500.

The sensor 400 includes a first sensor antenna 422 and a second sensor antenna 424 at different orientations to increase the chances of detecting the wireless signal 500 being transmitted by the thermostat antenna 320. The first sensor antenna 422 may be oriented at a first orientation and the second sensor antenna 424 may be oriented at a second orientation. The second orientation may be about perpendicular to the first orientation. In other words, the second sensor antenna 424 may be oriented at a pre-set angle $\alpha 1$ relative to the first sensor antenna 422. In an embodiment, the pre-set angle $\alpha 1$ may be about 90° (i.e., approximately perpendicular). The first sensor antenna 422 and the second sensor antenna 424 may be located in the same plane or in different planes.

The sensor 400 is configured to continuously monitor for wireless signals 500 being transmitted by the thermostat 300. The wireless signals 500 may be used to send commands to the sensor 400 and retrieve measured data from the sensor 400, (i.e., a wireless signal 500 might be used to waken the sensor 400 from sleep, then make a measurement of temperature, humidity, or any other data point, and then return the measured value via another wireless message.)

In an embodiment, first sensor antenna 422 and the second sensor antenna 424 may receive the wireless signal 500 one-at-a-time. In other words, when the first sensor antenna 422 is activated and receiving the wireless signal 500 then the second sensor antenna 424 is deactivated and not receiving the wireless signal 500, and when the second sensor antenna 424 is activated and receiving the wireless signal 500 then the first sensor antenna 422 is deactivated and not receiving the wireless signal 500. The sensor 400 may be configured to utilize the antenna switching device 420 to switch between the first sensor antenna 422 and the second sensor antenna 424. The antenna switching device 420 is configured to switch between the first sensor antenna 422 and the second sensor antenna 425. The antenna switching device 420 may be hardware. In an alternate embodiment, the first sensor antenna 422 and the second sensor antenna 424 may both be activated at the same time and receive the wireless signal 500 simultaneously.

The signal reception comparator 430 may be configured to determine a strength of wireless signals 500 received from each of the first sensor antenna 422 and the second sensor antenna 424 and compare the signal strengths at selected time intervals. The signal strength may be measured during the preamble (i.e., message header) of the transmitted message, but could also be measured during the transmission of the actual message. The comparator 430 may be software/firmware but the embodiments disclosed herein are also applicable to a hardware implementation of the comparator 430. The switching device 420 will then switch to the sensor antenna 422, 424 determined to have the highest signal strength. The sensor transceiver 440 will then be configured to receive wireless signals 500 from the sensor antenna 422, 424 determined to have the highest signal strength for a selected period of time. The selected time period may be the duration of the received message. During the reception of the next message, the signal strength and antenna choice may again be evaluated. The selected period of time may be a remainder of the select time interval after the determination of the determination of the sensor antenna 422, 424 with the highest signal strength. Software installed on the sensor memory 454 and implemented by the sensor processor 452 is configured to control the determining of the antenna 422, 424 with the highest signal strength and the switching to the antenna 422, 424 with the highest signal strength, which is a process referred to as antenna diversity.

Referring to FIG. 3, within continued references to FIGS. 1-2, a flow diagram illustrating a method 600 of operating a sensor 400 in wireless communication with the thermostat 300 of the HVAC system 20 is illustrated, in accordance with an embodiment of the present disclosure. In an embodiment, the method 600 may be performed by the sensor controller 450.

A block 604, a first sensor antenna 422 is activated to detect a first wireless signal 500 transmitted from the thermostat 300 of the HVAC system 20. The first sensor antenna 422 may be activated using an antenna switching device 420. The second sensor antenna 424 may be deactivated when the first sensor antenna 422 is activated to detect the first wireless signal 500 transmitted from the thermostat 300 of the HVAC system 20. At block 606, the first wireless signal 500 transmitted from the thermostat 300 is detected using the first sensor antenna 422. At block 608, a first strength of the first wireless signal 500 as detected by the first sensor antenna 422 is determined. The first signal strength may be determined by the signal reception comparator 430.

At block 610, a second sensor antenna 424 is activated to detect the first wireless signal 500 transmitted from the thermostat 300 of the HVAC system 20. The second sensor antenna 424 may be activated using an antenna switching device 420. The first sensor antenna 422 may be deactivated when the second sensor antenna 424 is activated to detect the first wireless signal 500 transmitted from the thermostat 300 of the HVAC system 20. At block 612, the first wireless signal 500 transmitted from the thermostat 300 is detected using the second sensor antenna 424. At block 614, a second strength of the first wireless signal 500 as detected by the second sensor antenna 424 is determined. The second signal strength may be determined by the signal reception comparator 430.

At block 616, the second signal strength is compared to the first signal strength to determine which of the first signal strength and the second signal strength is greater. The second signal strength may be compared to the first signal strength by the signal reception comparator 430.

The method 600 may move on to block 618 or 620 depending on which signal strength is stronger. If the first signal strength is greater than the second signal strength, then the method 600 moves onto block 618. If the second signal strength is greater than the first signal strength, then the method 600 moves onto block 618.

At block 618, future wireless signal 500s transmitted from the thermostat 300 for a first selected period of time are detected using the first sensor antenna 422 if the first signal strength is greater than the second signal strength.

At block 620, future wireless signal 500s transmitted from the thermostat 300 for the first selected period of time are detected using the second sensor antenna 424 if the second signal strength is greater than the first signal strength.

In an embodiment, the first sensor antenna 422 and the second sensor antenna 424 are activated at different times to detect the first wireless signal 500 transmitted from the thermostat 300 of the HVAC system 20. In other words, blocks 604 and 610 may occur at different times in one embodiment. In another embodiment, the first sensor antenna 422 and the second sensor antenna 424 are activated simultaneously to detect the first wireless signal 500 transmitted from the thermostat 300 of the HVAC system 20. In other words, blocks 604 and 610 may occur simultaneously or at the same time in one embodiment.

In an embodiment, the first sensor antenna 422 is oriented at a first orientation and the second sensor antenna 424 is oriented at a second orientation, the second orientation being different than the first orientation. In another embodiment, the second orientation is perpendicular to the first orientation.

Following blocks 618 or 620, and once the first selected period of time has ended, the method 600 may further comprise the following steps to re-determine which sensor antenna 422, 424 is best at detecting the current wireless signal 500s being transmitted by the thermostat 300. The first sensor antenna 422 is activated to detect a second wireless signal 500 transmitted from the thermostat 300 of the HVAC system 20 once the first selected period of time has ended. The second wireless signal 500 transmitted from the thermostat 300 is detected using the first sensor antenna 422. A third strength of the second wireless signal 500 as detected by the first sensor antenna 422 is determined. The second sensor antenna 424 is activated to detect the second wireless signal 500 transmitted from the thermostat 300 of the HVAC system 20. The second wireless signal 500 transmitted from the thermostat 300 is detected using the second sensor antenna 424. A fourth strength of the second wireless signal 500 as detected by the second sensor antenna 424 is determined. The fourth signal strength is compared to the third signal strength to determine which of the third signal strength and the fourth signal strength is greater. Then future wireless signal 500s transmitted from the thermostat 300 for a second selected period of time are detected using the first sensor antenna 422 if the third signal strength is greater than the fourth signal strength or using the second sensor antenna 424 if the fourth signal strength is greater than the third signal strength.

While the above description has described the flow process of FIG. 3 in a particular order, it should be appreciated that unless otherwise specifically required in the attached claims that the ordering of the steps may be varied and/or combined.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

As described above, embodiments can be in the form of processor-implemented processes and devices for practicing those processes, such as processor. Embodiments can also be in the form of computer program code (e.g., computer program product) containing instructions embodied in tangible media (e.g., non-transitory computer readable medium), such as floppy diskettes, CD ROMs, hard drives, or any other non-transitory computer readable medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes a device for practicing the exemplary embodiments. When implemented on a general-purpose microprocessor, the computer program code segments configure the microprocessor to create specific logic circuits.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method of operating a sensor in wireless communication with a thermostat of a heating, ventilation, and air conditioning (HVAC) system, the method comprising:
   activating a first sensor antenna and a second sensor antenna to detect a first wireless signal transmitted from the thermostat of the HVAC system;

detecting the first wireless signal transmitted from the thermostat using the first sensor antenna and the second sensor antenna;
   determining a first strength of the first wireless signal as detected by the first sensor antenna and a second strength of the first wireless signal as detected by the second sensor antenna;
   comparing the second signal strength to the first signal strength to determine which of the first signal strength and the second signal strength is greater;
   detecting future wireless signals transmitted from the thermostat for a first selected period of time using the first sensor antenna if the first signal strength is greater than the second signal strength or detecting future wireless signals transmitted from the thermostat for the first selected period of time using the second sensor antenna if the second signal strength is greater than the first signal strength;
   activating the first sensor antenna and the second sensor antenna to detect a second wireless signal transmitted from the thermostat of the HVAC system once the first selected period of time has ended;
   detecting the second wireless signal transmitted from the thermostat using the first sensor antenna and the second sensor antenna;
   determining a third strength of the second wireless signal as detected by the first sensor antenna and a fourth strength of the second wireless signal as detected by the second sensor antenna;
   comparing the fourth signal strength to the third signal strength to determine which of the third signal strength and the fourth signal strength is greater; and
   detecting future wireless signals transmitted from the thermostat for a second selected period of time using the first sensor antenna if the third signal strength is greater than the fourth signal strength or detecting future wireless signals transmitted from the thermostat for the second selected period of time using the second sensor antenna if the fourth signal strength is greater than the third signal strength.

2. The method of claim 1,
   wherein the first sensor antenna is oriented at a first orientation and the second sensor antenna is oriented at a second orientation, the second orientation being different than the first orientation.

3. The method of claim 2, wherein the second orientation is perpendicular to the first orientation.

4. The method of claim 1, wherein the first sensor antenna and the second sensor antenna are activated at different times to detect the first wireless signal transmitted from the thermostat of the HVAC system.

5. The method of claim 1, wherein the second sensor antenna is deactivated when the first sensor antenna is activated to detect the first wireless signal transmitted from the thermostat of the HVAC system.

6. The method of claim 1, wherein the first sensor antenna is deactivated when the second sensor antenna is activated to detect the first wireless signal transmitted from the thermostat of the HVAC system.

7. The method of claim 1, wherein the first sensor antenna and the second sensor antenna are activated simultaneously to detect the first wireless signal transmitted from the thermostat of the HVAC system.

8. A sensor for a heating, ventilation, and air conditioning (HVAC) system, the sensor comprising:
   a sensing apparatus configured to detect at least a temperature;

a first sensor antenna;

a second sensor antenna; and a sensor controller comprising:

a processor; and a memory comprising computer-executable instructions that, when executed by the processor, cause the processor to perform operations, the operations comprising:

activating the first sensor antenna and the second sensor antenna to detect a first wireless signal transmitted from a thermostat of the HVAC system;

detecting the first wireless signal transmitted from the thermostat using the first sensor antenna and the second sensor antenna;

determining a first strength of the first wireless signal as detected by the first sensor antenna and a second strength of the first wireless signal as detected by the second sensor antenna;

comparing the second signal strength to the first signal strength to determine which of the first signal strength and the second signal strength is greater; and detecting future wireless signals transmitted from the thermostat for a first selected period of time using the first sensor antenna if the first signal strength is greater than the second signal strength or detecting future wireless signals transmitted from the thermostat for the first selected period of time using the second sensor antenna if the second signal strength is greater than the first signal strength;

wherein the operations further comprise:

activating the first sensor antenna and the second sensor antenna to detect a second wireless signal transmitted from the thermostat of the HVAC system once the first selected period of time has ended;

detecting the second wireless signal transmitted from the thermostat using the first sensor antenna and the second sensor antenna;

determining a third strength of the second wireless signal as detected by the first sensor antenna and a fourth strength of the second wireless signal as detected by the second sensor antenna;

comparing the fourth signal strength to the third signal strength to determine which of the third signal strength and the fourth signal strength is greater; and detecting future wireless signals transmitted from the thermostat for a second selected period of time using the first sensor antenna if the third signal strength is greater than the fourth signal strength or detecting future wireless signals transmitted from the thermostat for the second selected period of time using the second sensor antenna if the fourth signal strength is greater than the third signal strength.

9. The sensor of claim 8, wherein the first sensor antenna is oriented at a first orientation and the second sensor antenna is oriented at a second orientation, the second orientation being different than the first orientation.

10. The sensor of claim 9, wherein the second orientation is perpendicular to the first orientation.

11. The sensor of claim 8, further comprising:

an antenna switching device configured to switch between the first sensor antenna and the second sensor antenna.

12. The sensor of claim 8, further comprising:

a signal reception comparator configured to determine a strength of wireless signals received from each of the first sensor antenna and the second sensor antenna and compare signal strengths at selected time intervals.

13. The sensor of claim 8, wherein the first sensor antenna and the second sensor antenna are activated at different times to detect the first wireless signal transmitted from the thermostat of the HVAC system.

14. The sensor of claim 8, wherein the operations further comprise:

deactivating the second sensor antenna when the first sensor antenna is activated to detect the first wireless signal transmitted from the thermostat of the HVAC system.

15. The sensor of claim 8, wherein the operations further comprise:

deactivating the first sensor antenna when the second sensor antenna is activated to detect the first wireless signal transmitted from the thermostat of the HVAC system.

16. The sensor of claim 8, wherein the first sensor antenna and the second sensor antenna are activated simultaneously to detect the first wireless signal transmitted from the thermostat of the HVAC system.

17. A computer program product tangibly embodied on a non-transitory computer readable medium, the computer program product including instructions that, when executed by a processor, cause the processor to perform operations comprising:

activating a first sensor antenna and second sensor antenna to detect a first wireless signal transmitted from a thermostat of a HVAC system;

detecting the first wireless signal transmitted from the thermostat using the first sensor antenna and the second sensor antenna;

determining a first strength of the first wireless signal as detected by the first sensor antenna and a second strength of the first wireless signal as detected by the second sensor antenna;

comparing the second signal strength to the first signal strength to determine which of the first signal strength and the second signal strength is greater; and detecting future wireless signals transmitted from the thermostat for a first selected period of time using the first sensor antenna if the first signal strength is greater than the second signal strength or detecting future wireless signals transmitted from the thermostat for the first selected period of time using the second sensor antenna if the second signal strength is greater than the first signal strength;

wherein the operations further comprise:

activating the first sensor antenna and the second sensor antenna to detect a second wireless signal transmitted from the thermostat of the HVAC system once the first selected period of time has ended;

detecting the second wireless signal transmitted from the thermostat using the first sensor antenna and the second sensor antenna;

determining a third strength of the second wireless signal as detected by the first sensor antenna and a fourth strength of the second wireless signal as detected by the second sensor antenna;

comparing the fourth signal strength to the third signal strength to determine which of the third signal strength and the fourth signal strength is greater; and detecting future wireless signals transmitted from the thermostat for a second selected period of time using the first sensor antenna if the third signal strength is greater than the fourth signal strength or detecting future wireless signals transmitted from the thermostat for the second selected period of time using the second sensor antenna if the fourth signal strength is greater than the third signal strength.

* * * * *